(12) United States Patent
Hughes et al.

(10) Patent No.: US 11,885,439 B2
(45) Date of Patent: Jan. 30, 2024

(54) MICROVALVE, AND A MULTI-DIRECTIONAL VALVE APPARATUS

(71) Applicant: CN Bio Innovations Limited, Thame (GB)

(72) Inventors: David James Hughes, Thame (GB); Sia Bahrami, Thame (GB)

(73) Assignee: CN Bio Innovations Limited, Thame (GB)

( * ) Notice: Subject to any disclaimer, the term of this patent is extended or adjusted under 35 U.S.C. 154(b) by 150 days.

(21) Appl. No.: 17/427,463

(22) PCT Filed: Jan. 24, 2020

(86) PCT No.: PCT/GB2020/050172
§ 371 (c)(1),
(2) Date: Jul. 30, 2021

(87) PCT Pub. No.: WO2020/157472
PCT Pub. Date: Aug. 6, 2020

(65) Prior Publication Data
US 2022/0146017 A1    May 12, 2022

(30) Foreign Application Priority Data

Jan. 30, 2019   (GB) ..................... 1901294

(51) Int. Cl.
*F16K 99/00* (2006.01)

(52) U.S. Cl.
CPC ...... *F16K 99/0015* (2013.01); *F16K 99/0013* (2013.01); *F16K 99/0023* (2013.01); *F16K 99/0028* (2013.01)

(58) Field of Classification Search
CPC ............. F16K 99/0015; F16K 99/0013; F16K 99/0023; F16K 99/0028

(Continued)

(56) References Cited

U.S. PATENT DOCUMENTS 2,920,578 A * 1/1960 Schaurte ............... F04B 43/14
                                                    417/477.7
4,119,120 A * 10/1978 Mehaffy ............... G01N 30/20
                                                    137/885

(Continued)

FOREIGN PATENT DOCUMENTS

GB         2131130      6/1984
JP         2017003032   1/2017

(Continued)

*Primary Examiner* — Minh Q Le
(74) *Attorney, Agent, or Firm* — Woods Oviatt Gilman LLP; Katherine H. McGuire, Esq.

(57) ABSTRACT

A microvalve comprising a hard base 14, a clamping plate 12, an inlet port 96, 98, an outlet port 96, 98, a membrane 16, a ball bearing 18 and a drive head 20; wherein the hard base comprises a recess over which the membrane is clamped by the clamping plate, the recess defining a cup with a generally spherical cap shaped surface and a perimeter, both of the inlet and outlet ports being in the recess, and at least one of them being in the generally spherical cap shaped surface; wherein the membrane extends across the recess and is clamped thereover, and it is flexible for enabling the unclamped part of it to be flexed into the recess by the ball bearing in the clamping plate on the other side of the membrane to the recess upon actuation by the drive head behind the ball bearing for selective driving of the ball bearing against the membrane to flex the membrane into the recess as the membrane flexes around part of the ball bearing to move the membrane from a condition in which both ports are open to a port closing condition, the port closing condition being where the membrane has been flexed to extend over either one of, or alternatively both of, the input port and the output port, and clamped thereagainst by the ball bearing.

20 Claims, 15 Drawing Sheets

(58) Field of Classification Search
USPC ....... 137/885, 449, 505.36, 539; 251/315.01, 251/331
See application file for complete search history.

(56) References Cited

U.S. PATENT DOCUMENTS

| | | | | |
|---|---|---|---|---|
| 4,858,883 | A | * | 8/1989 | Webster ................ F16K 11/022 137/884 |
| 5,601,115 | A | | 2/1997 | Broerman |
| 8,585,013 | B2 | * | 11/2013 | Chung ................ F16K 99/0015 251/368 |
| 9,618,129 | B2 | * | 4/2017 | Block, III ........... F16K 99/0023 |
| 9,874,285 | B2 | * | 1/2018 | Block, III .............. C12M 23/16 |
| 2001/0054702 | A1 | * | 12/2001 | Williams ............ F16K 99/0017 251/61 |
| 2004/0075073 | A1 | | 4/2004 | Claydon et al. |
| 2006/0260700 | A1 | * | 11/2006 | Bauerle .............. F16K 99/0001 137/625.46 |
| 2010/0166609 | A1 | * | 7/2010 | Hagiwara ........... F16K 99/0001 422/240 |
| 2011/0049401 | A1 | * | 3/2011 | Chung ................ F16K 99/0046 29/890.131 |
| 2014/0004505 | A1 | * | 1/2014 | Su ...................... G01N 33/5304 435/7.37 |
| 2014/0356849 | A1 | | 12/2014 | Wikswo et al. |
| 2017/0144155 | A1 | * | 5/2017 | Bohm .................... G01N 35/08 |
| 2018/0080570 | A1 | * | 3/2018 | Block, III .............. C12M 23/16 |
| 2021/0197194 | A1 | * | 7/2021 | Schaffer .................. B01L 3/527 |
| 2021/0198607 | A1 | * | 7/2021 | Wikswo ................. C12M 23/12 |
| 2021/0252510 | A1 | * | 8/2021 | Schaffer ............. F04B 43/1269 |

FOREIGN PATENT DOCUMENTS

| | | |
|---|---|---|
| WO | 02070932 | 9/2002 |
| WO | 2005098289 | 10/2005 |
| WO | 2007125468 | 11/2007 |
| WO | 2014081840 | 5/2014 |

* cited by examiner

MICROVALVE, AND A MULTI-DIRECTIONAL VALVE APPARATUS

The present invention relates to a microvalve, and a multi-directional valve apparatus formed therewith, the valve therein also perhaps being known as a normally closed valve, as they usually default to a closed condition. The apparatus can also be a multi-port, multi-throw, interconnection or switch, for selective connection of one or multiple input feed(s) to one or multiple output feed(s). Channels are provided in the apparatus to connect between the input and the output.

The present invention seeks to provide a robust and repeatable sealing of appropriate respective channels to allow repeated and continuous operation of the apparatus, for example by rotation of a drive head to trigger a consequential sequence of actuations of each of a plurality of microvalves for providing a sequence of different connections within the apparatus.

Microvalves arranged in a ring for sequential activation by rotation of a drive head—i.e. to rotate a release mechanism from one valve to another to trigger through a sequence of actuations of each of the plurality of the microvalves for thus providing a sequence of different connections, are known. In these prior art valves, a schematic representation of which is provided in FIGS. 14 and 15, an elastomeric base 50 is required in order to enable sealing of fluid channels 46 thereon. Sealing of the respective channel 46 occurs when a ball bearing 18 for that channel 46 deflects a proximal wall 52 of the fluidic channel 46 (i.e. the wall 52 which is in contact with the ball bearing 18) causing it to meet and deflect 54 the distal wall 50 of the channel 46, thus forming a pinch 56 and thus a seal. This is the normally closed position, i.e. the ball bearing tends to be in this position by virtue of a biasing force provided by a drive head 20. See FIG. 14. The fluid channel is instead non-occluded (i.e. the pinch 56, or seal, and thus the valve for that channel 46, is open) when the ball bearing 18 instead pops down into a groove 58 in the drive head 20 that has rotated to a position below the ball bearing 18. See FIG. 15. The groove 58 is also shown in FIG. 14 prior to its rotation into that valve open position for that particular valve of the apparatus.

The disadvantage of valves of this kind is that they are difficult to operate independently relative to closely neighbouring channels, because the elastomeric nature of the base 50 permits transmission of elastic forces through the base 50, impairing the valve seal performance in the closely neighbouring microvalves (not shown). Such elastic forces will naturally be generated upon deformation of the proximal walls of the fluid channel there against (for ensuring the seal) by the force applied by the ball bearing for that channel. Measures thus need to be taken to mitigate this effect, usually by further spacing the valves apart, thus making the apparatus bigger, or by careful calibration of the force to be applied to each ball bearing through positional adjustment of a collar onto which the drive head is mounted. This will temporarily ensure each microvalve can be efficiently opened and closed upon rotation of the drive head. However, upon repeated rotation of the drive head and consequent actuation of the microvalves (for example over long run times or high revolutions per minute of the drive head), drift in sealing performance can still be observed resulting in escape of fluid into nominally closed fluid channels, which leakage can result in problematic fluid contamination, unwanted distribution of fluid and experimental failure.

The construction of the base or channels from elastomeric materials—to permit a full pinching effect across the width of the channel—due to the roundness of the ball bearing, can also be disadvantageous where soluble factors present in the fluids within the channel are liable to adsorption or absorption into or out of the elastomer resulting in uncontrolled changes to the composition of the fluid and/or leaching of ad/absorbents into fluids subsequently passing through the channels. The present invention also seeks to reduce this effect, which effect is accepted to be difficult to eliminate completely when using flexible materials.

According to the present invention there is provided a microvalve comprising a hard base, a clamping plate, an inlet port, an outlet port, a membrane, a ball bearing and a drive head; wherein
the hard base comprises a recess over which the membrane is clamped by the clamping plate, the recess defining a cup with a generally spherical cap shaped surface and a perimeter, both of the inlet and outlet ports being in the recess, and at least one of them being in the generally spherical cap shaped surface;
the membrane extends across the recess and beyond the perimeter, whereat it is clamped, and is flexible for enabling the unclamped part of it to be flexed into the recess;
the ball bearing is arranged opposing the recess, in the clamping plate on the other side of the membrane to the recess; and
the drive head is behind the ball bearing for selective driving of the ball bearing against the membrane to flex the membrane into the recess as the membrane flexes around part of the ball bearing to move the membrane from a condition in which both ports are open to a port closing condition, the port closing condition being where the membrane has been flexed to extend over either one of, or alternatively both of, the input port and the output port, and clamped thereagainst by the ball bearing.

Preferably the generally spherical cap shaped surface has a radius larger than the radius of the ball bearing to allow the ball bearing to compress the membrane to the base of the cup.

Preferably the base of the cup has one of the ports.

Preferably the closed port is the outlet port. However, fluid flowing through the micro valve might be run in reverse to make it an input port. As such the micro valve might be bi-directional, allowing flow in either direction through the passages and ports thereof, in addition to being multi-directional due to the presence of multiple selectable ports and cups.

As the cup has a generally spherical surface, the ball bearing's similarly spherical surface will create a ring seal with the flexible membrane over the closed port.

Upon release of the pressure from the drive head, either the weight of the ball bearing, if the micro valve is suitably orientated, or the pressure of the fluid, will cause the ball bearing to release the seal on the port by pressing against the membrane to return the micro seal to a port open condition. In other embodiments, the drive head may have a magnet to pull the ball bearing into a port open condition, thus enabling the valve to work in any orientation, irrespective of the pressure of the fluid.

Preferably, the drive head allows the ball bearing to retract adequately to allow the membrane to unflex to a flat condition across the recess, thus allowing unrestricted flow of fluid between the two ports.

It is possible for more than one input or output ports to be provided in the cup, but usually there is only one input and one output.

In one example there are two or more inputs and at least one output. The valve in this arrangement can be arranged to act as a small volume mixing chamber, when open, for the two or more, or multiple, input fluids, thus providing mixing of fluids at the open valve for supplying mixed fluid at the chosen output. This allows efficient mixing and space saving, and the potential for adding and mixing fluids more quickly than doing the mixing subsequent to the valve.

Preferably the clamping of the membrane between the hard base and the clamping base is by screwing or bolting the clamping plate to the hard base with the membrane between them—the clamping plate's membrane engaging face will surround the perimeter. Another configuration could have the membrane bonded to either of or both of the hard base and the clamping base (preferably to the clamping base, and more preferably to both).

Preferably the hard base also has at least one channel recessed into its membrane facing surface, the membrane also extending across such channels, the clamping plate's membrane engaging face thus also engaging the membrane against the sides of those channels, whereupon the compression of the membrane along those sides to define one or more fluid channel. Preferably at least one of those channels leads to one of the inlet port or the outlet port. It can even create a part of the side of one of the ports.

Preferably the drive head has forward surface with a groove in an otherwise flat surface, and the drive head's forward surface can move relative to the ball bearing. The groove allows the ball bearing to retract to thus enable the port open condition of the valve, whereas the flat surface engages the port closed condition.

According to a further aspect of the present invention there is provided a multi-directional valve apparatus comprising a plurality of microvalves as defined above with a common drive head, but separate ball bearings and cups in each micro valve, and a fluid line around and connecting to all of the micro valves, the microvalves being arranged for sequential activation by movement of the drive head to selectively retract one or more ball bearing of the micro valves to selectively open the port(s) of that micro valve.

Preferably the fluid line is formed to connect separately to each micro valve by a branch from a main channel. The branch in a preferred embodiment is a radially extending channel.

Preferably the main channel is formed by a common membrane extending across all the valves, and which membrane seals over a groove in a common hard base to create the fluid line. There might instead be individual membranes for each microvalve, although a single common membrane is preferred for simplicity of assembly.

The valve apparatus may comprise the drive head with the groove, the groove moving from one ball bearing to another for selecting which valve to open, and the flat surface maintaining the other valves closed.

The drive head may have more than one groove to allow more than one valve to open.

The groove may be such that it can open more than one of the valves.

The multi-directional valve apparatus may have its multiple cups in a common hard base.

Preferably the cups are all arranged in one or more rings. Those rings of cups face towards the "forward" facing surface of the drive head, which forward facing surface has a groove on an edge portion thereof so that upon rotation of the drive head, the various ball bearings can be selectively retracted from its default port closed condition to its port open condition as it falls or retracts into the groove from its port closed condition to thus open the port in that ball bearing's associated cup. Then, upon further rotating the drive head, that open port will again be closed by the ball bearing being pushed back into its port closed condition, thus closing the port and the groove will swing instead to the next ball bearing in the sequence to open the port in the respective associated cup. Thus the microvalve is arranged for sequential activation of its various ports (in the cups) by rotation of the drive head, and thus the groove.

The cups may instead be arranged in one or more lines. The lines may be parallel lines. The drive head instead then instead moves in a linear direction to sequentially open and close the microvalves.

Preferably the cups are arranged in one or more rings. The rings may be concentric. The rings may be C shaped rather than fully enclosed rings. Preferably an inflow to the valve apparatus would be at or adjacent the gap of at least one of the C rings, and multiple outflow ports are provided, one in each cup.

By way of the present invention, the effect of adsorption or absorption into or out of the elastomer resulting in uncontrolled changes to the composition of the fluid and/or leaching of ad/absorbents into fluids subsequently passing through the channels is reduced by reducing the amount of elastomeric components in the valve to only the membrane. That membrane forms only one surface of the fluid path through the valve, and when the membrane also forms part of the channel, that effect is further enhanced. In the prior art of FIGS. 14 and 15, the channel is a tube formed by a membrane and an elastomeric base as the base needs to flex to create an appropriate seal.

By selecting elastomeric or polymer materials that are less prone to ad/absorption for the membrane, this benefit can be enhanced even further. For example, preferred materials include, but are not limited to, polyurethane (PU), cyclic olefin copolymer (COC), thermoplastic polyurethane (TPU), silicone, polydimethylsiloxane (PDMS), also known as dimethylpolysiloxane or dimethicone, or Flexdym®.

To assist in avoiding inadvertent sticking of the membrane to the hard base, particularly after continued use of the microvalve, or due to excessive compression of the membrane, the hard base or the membrane may be coated with a conventional non-stick or lubricating coating, such as PTFE. This can prolong the life of the micro-valve.

The present invention also enables a more convenient manufacture, assembly and set-up of a multi-port multi-throw interconnection of multiple input and output channels and it gives a more robust and repeatable sealing upon repeated rotation of the drive head and consequent actuation of the microvalves, compared to that with valves in which the deflection of the base is intended for forming the seal, such as that in FIGS. 14 and 15 as the hardness of the hard base resists the deformation that is present in the prior art, whereby it effectively seals back against the membrane too without notable deflection. As a consequence the ball bearing does not need to press as hard against the membrane to create the seal over the port on the other side thereof. Furthermore the base will have a lower tendency to vary in shape over time as it is not being flexed. The microvalves described in this invention thus represent an improvement to the art of microvalves Preferred hardness values for the material for the hard base is at least a Shore hardness 50D measured using a durometer gauge, and more preferably at least 80D, or more than 95A. A most preferred hardness is at least 70D on the shore hardness scale, or even greater than 100D.

The hard base may be made of any such hard material, such as HDPE, PVC, polysulfone, COC, polycarbonate, polystyrene or ABS.

Alternatively it is a material that is at least as hard as zinc, i.e. having a Mohs value of 2.5 or more. The drive head typically is likewise this hard.

The valve apparatus of the present invention enables robust repeatable sealing of a plurality of fluidic channels in fluid communication with each other via an angled normally closed microvalve. In the following illustrated examples, the angle is 90 degrees to the membrane's plane. That angle, however, can be varied. It is preferably centred at an angle relative to the radial centre of its valve's ball bearing, when the ball bearing is in its default closed position, of between 45 and 135°, inclusive, and more preferably at an angle between 70 and 110°, or even 80 to 100, inclusive. Going further than 45 to 135 degrees can be possible, but is less preferable as the finite thickness of the membrane, which is thin—typically between 1 mm and 0.001 mm (1000 um and 1 um), possibly up to perhaps 2 mm thick, but more preferably between 0.05 mm and 0.1 mm, or ideally between 0.05 and 0.3 mm, with usual stock thicknesses for suitable membranes being 0.05 mm, 0.1 mm, 0.125 mm, 0.15 mm. 0.2 mm, 0.25 mm or 0.3 mm thick—makes such angles difficult to seal with the ball bearing's movement against that membrane, although deepening the cup could address that. However, in the preferred embodiments, the ball bearing diameter is larger than the diameter of the perimeter of the cup (albeit with the radius of the curvature of the cup, if part spherical, being larger than the radius of the spherical ball bearing). This is so that the ball bearing won't fully insert into the cup—only the leading portion of it does.

The depth of the cup (also known as valve seat), will typically be up to 80% of the radius of the ball bearing, but more preferably it is no more than 50%, and more preferably no more than 35% of the radius of the ball bearing. In some embodiments the depth can be between 10 and 30% of the radius of the ball bearing.

The radially extending channel can be shallower than the main channel 46. Preferably the main channel has the same depth as the cup or a depth that is less than the depth of the cup.

It is possible also to measure port positions with respect to the path defined by membrane when straight across the perimeter, i.e. the flat underside of the membrane. Ideally the port would be angled still at 90 degrees, but angles of up to 50 degrees from that centre would certainly be possible, with wider angles being again harder to seal. Preferably it is between 70 and 110 degrees.

Angling up on the opposite side of the cup to the radially extending channel is typically easier to seal at lower positions, but taking that to zero (i.e. providing a linear fluid channel across the valve, similar to the prior art), will be unlikely to seal completely with the design of the present invention because the elastomeric membrane would likely leave an opening or gap around the lower part of the cup—see FIG. 6. This gap is preferred upon insertion of the ball bearing, and hence the spherical cap part of the cup preferably has a bigger diameter than the ball bearing. It enables quicker seating of the ball bearing in the cup from a valve open position during fast use of the apparatus, (i.e. rapid rotation of the drive head) and it minimises pinch-cutting of the membrane against the edge of the cup, which edge can be rounded to further minimise that risk.

The requirement for the sealing port to be positioned at an angle with respect to a (non-sealing) port defined by fluid channel formed in part by the membrane solves the problem of producing a robust seal in that sealing port when the elastomeric membrane has a finite thickness and elasticity. This prevents the possibility of the ball bearing exactly matching the shape of the cup with a zero gap at the periphery.

The port size is typically between 3 mm and 0.1 mm. The perimeter diameter is typically between 5 and 0.1 mm, preferably 2.5 mm. The ball bearing typically has a diameter of between 7 and 0.2 mm.

The clamping plate, hard base and drive head may be all injection moulded, although they, or some of them, can be otherwise manufactured, such as by machining or stamping.

The present invention has many possible uses, including use in micro formulators, or perfusion controllers for single and multi-organ chips.

Preferably the clamping of the clamping plate to the hard base is provided by bolts located on both sides of the rings or lines of cups, and ideally within a distance of 0.4 to 20× the diameter of the cups, or 1× to 5× the diameter of the bolts. As a consequence, the membrane is pinned to the hard base, around the cups, and channels where provided, by the clamping plate, in a manner that provides for localisation of the flexing of the membrane. As the membrane is needed to flex, it will be an elastomeric material. Localising the elastic forces with such local clamping ensures that the fluid pathways and seals are accurate and controlled.

Preferably the locations of the bolts are generally symmetrical to offer a balanced force to the plates.

Preferably the drive head is maintained in its advance position by a spring located behind the drive head which applies a force to the ball bearings. Preferably it surrounds a stem of the drive head, which stem enables an actuator to rotate the drive head. With a ring spring, a substantially uniform force will be applied to each ball bearing in its advanced position (port closed condition), obviating the need for positional adjustment of a collar/drive head, that can otherwise be needed to calibrate sealing performance, e.g. as per the prior art. Such calibration—to prevent early wear on the fluid conduit of the prior art microvalves—can be very time-consuming, as it needs to be conducted individually for each of a plurality of valves in the prior art.

The microvalves described in this invention disclosure represent an improvement to the valves described in U.S. Pat. No. 9,618,129 because they enable more convenient manufacture and assembly of multi-port multi-throw interconnection of multiple input and output channels and give robust repeatable sealing upon repeated rotation of the drive head and consequent actuation of the microvalves.

In use, multiple of these microvalves, or multiple of these multi-directional valve apparatus, may be assembled together in an array, or in parallel, or in series, or combinations of both, for permitting complex and selectable fluid pathways to be provided, perhaps with computer controlled, independently drivable and controllable, drive heads for each microvalve or apparatus.

The present invention will now be described in further detail, purely by way of example, with reference to the accompanying drawings, in which:

FIG. 1 shows an exploded view of a microvalve in accordance with the present invention;

FIG. 2 provides a close of exploded view of the main valve elements;

FIG. 3 provides an alternative perspective exploded view of the main valve elements of FIG. 2;

FIG. 4 provides a plan view of the hard plate provided with channels and input and exit ports;

FIG. 5 provides a section through the assembled valve, showing a valve in a closed condition;

Figure 10:
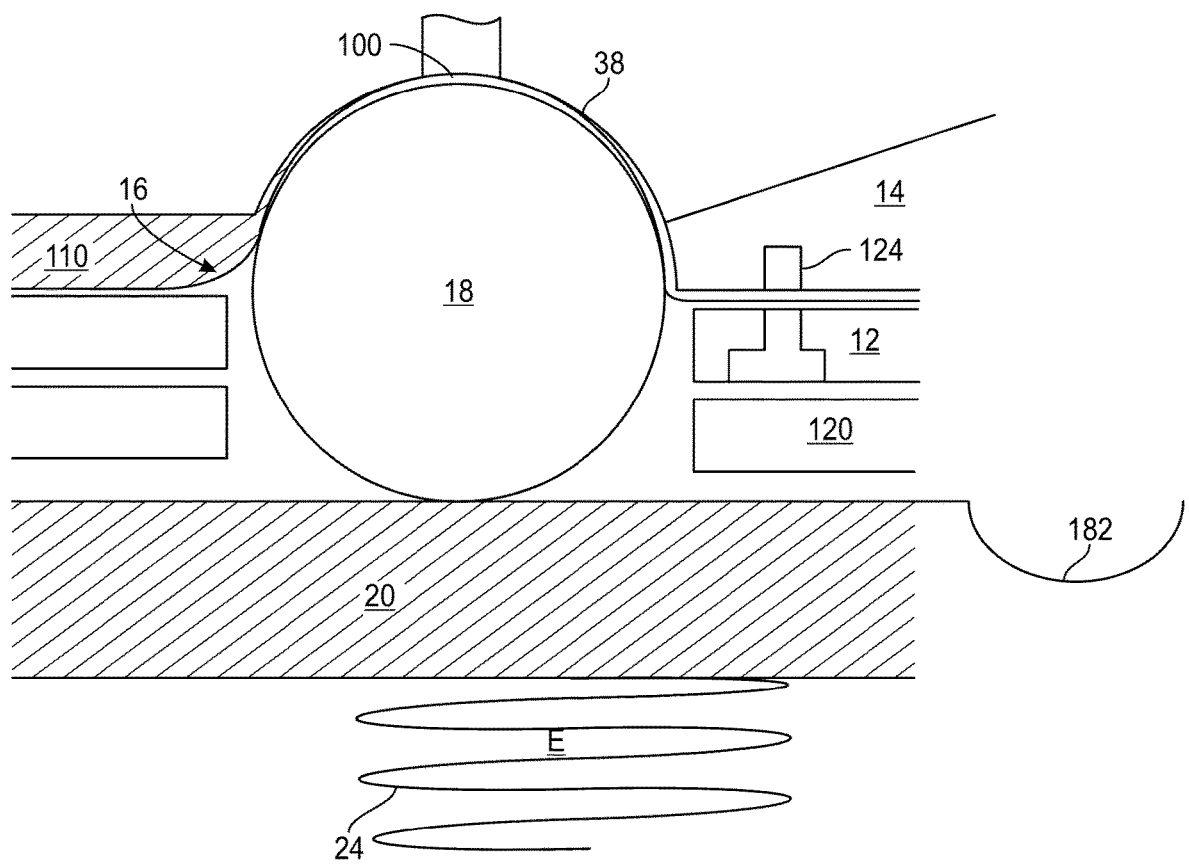
Figure 11:
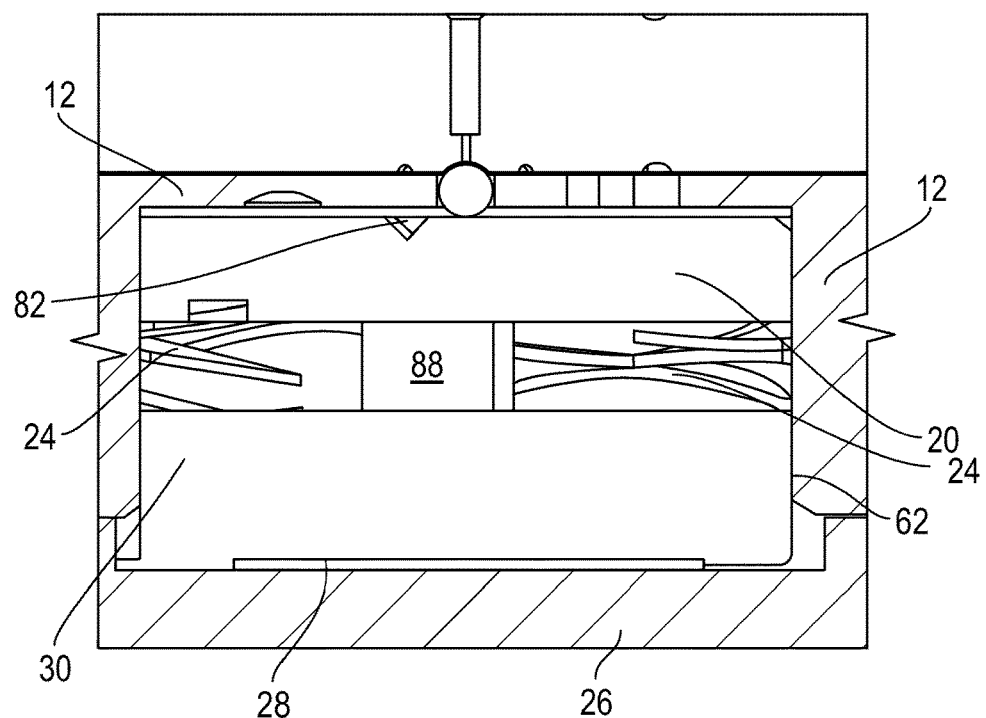
Figure 12:
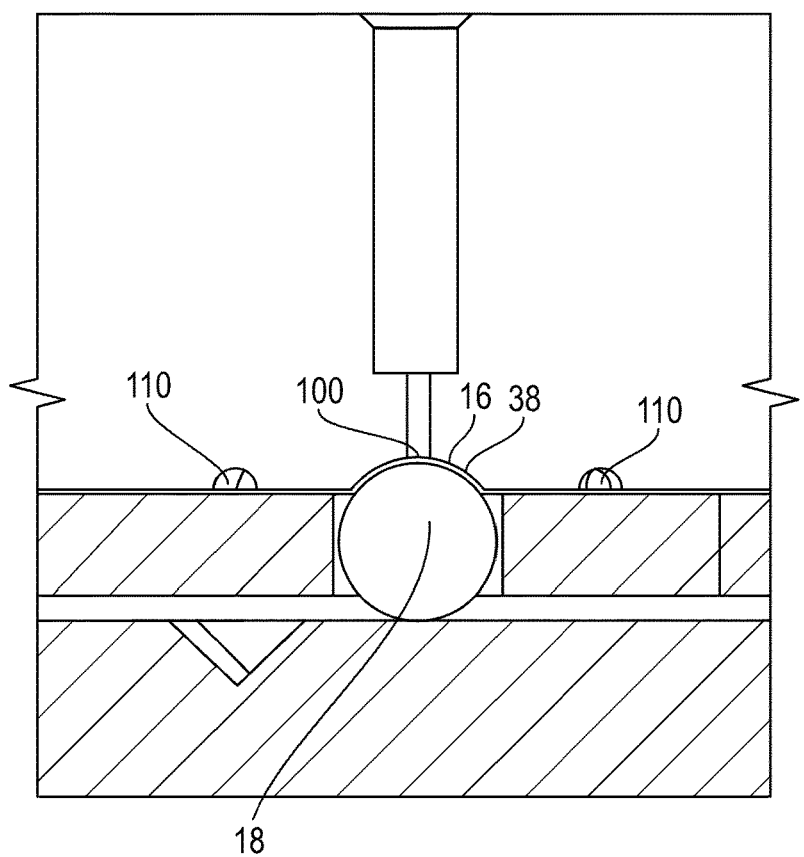
Figure 13:
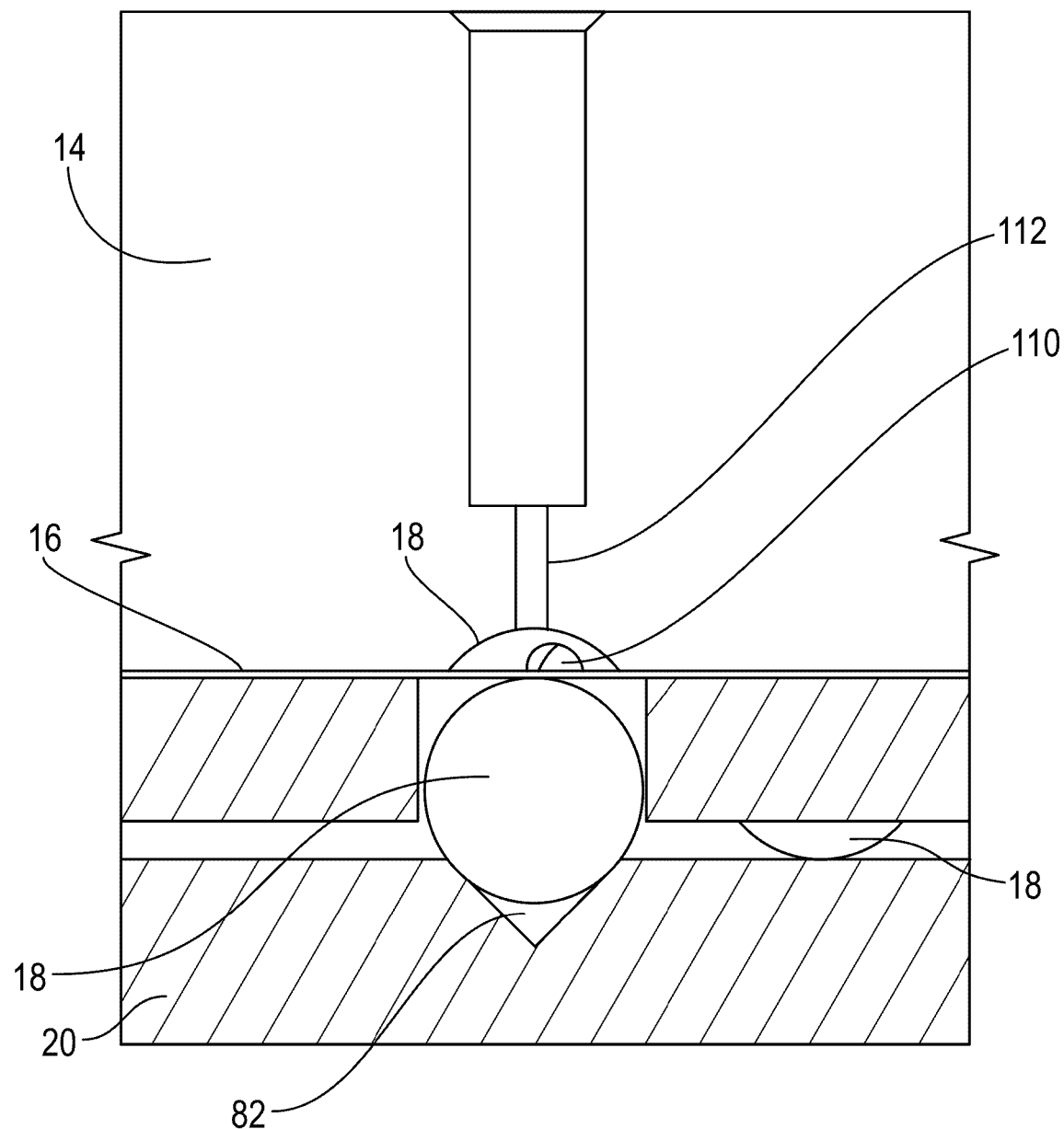
Figure 14:
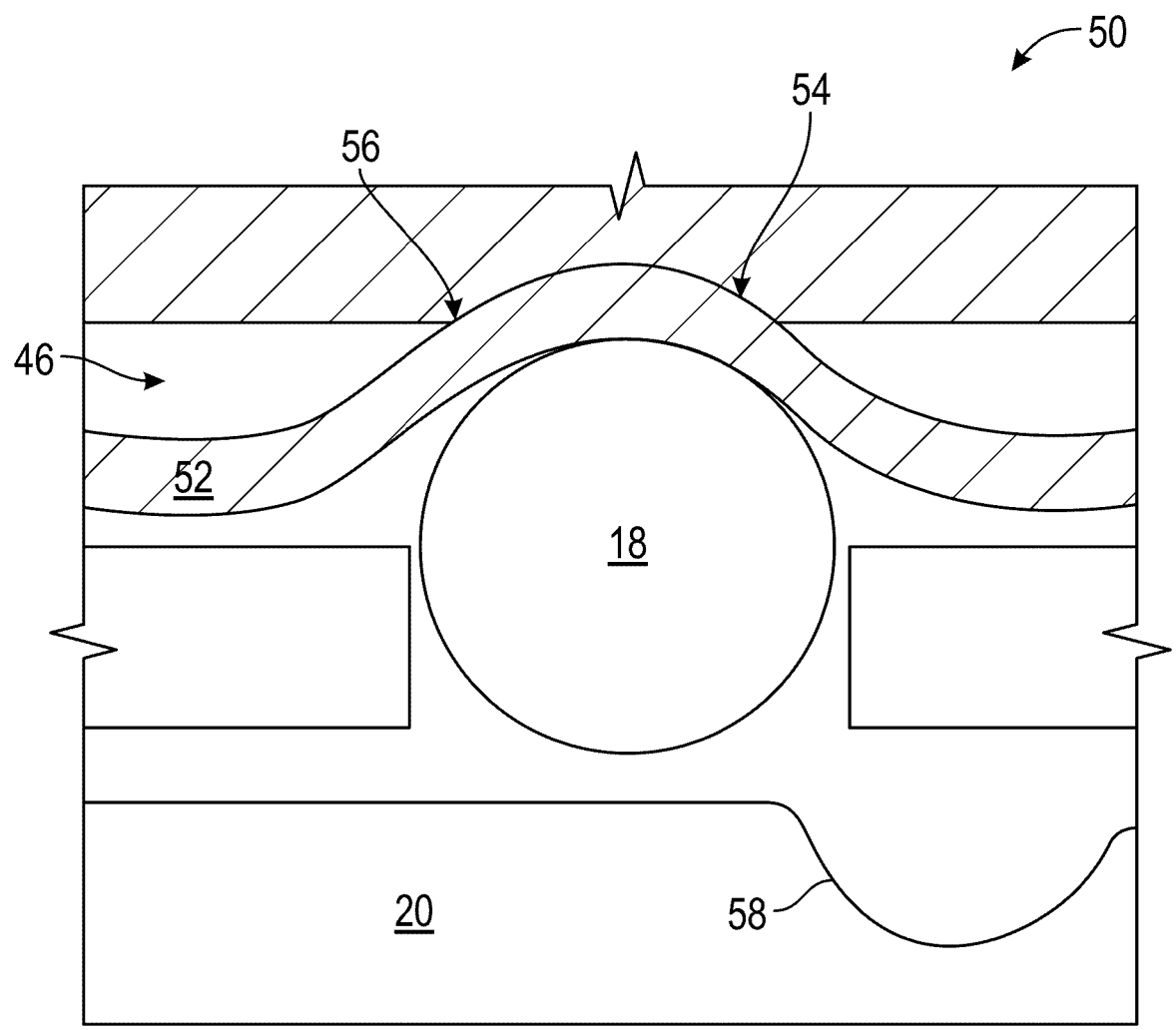
Figure 15:
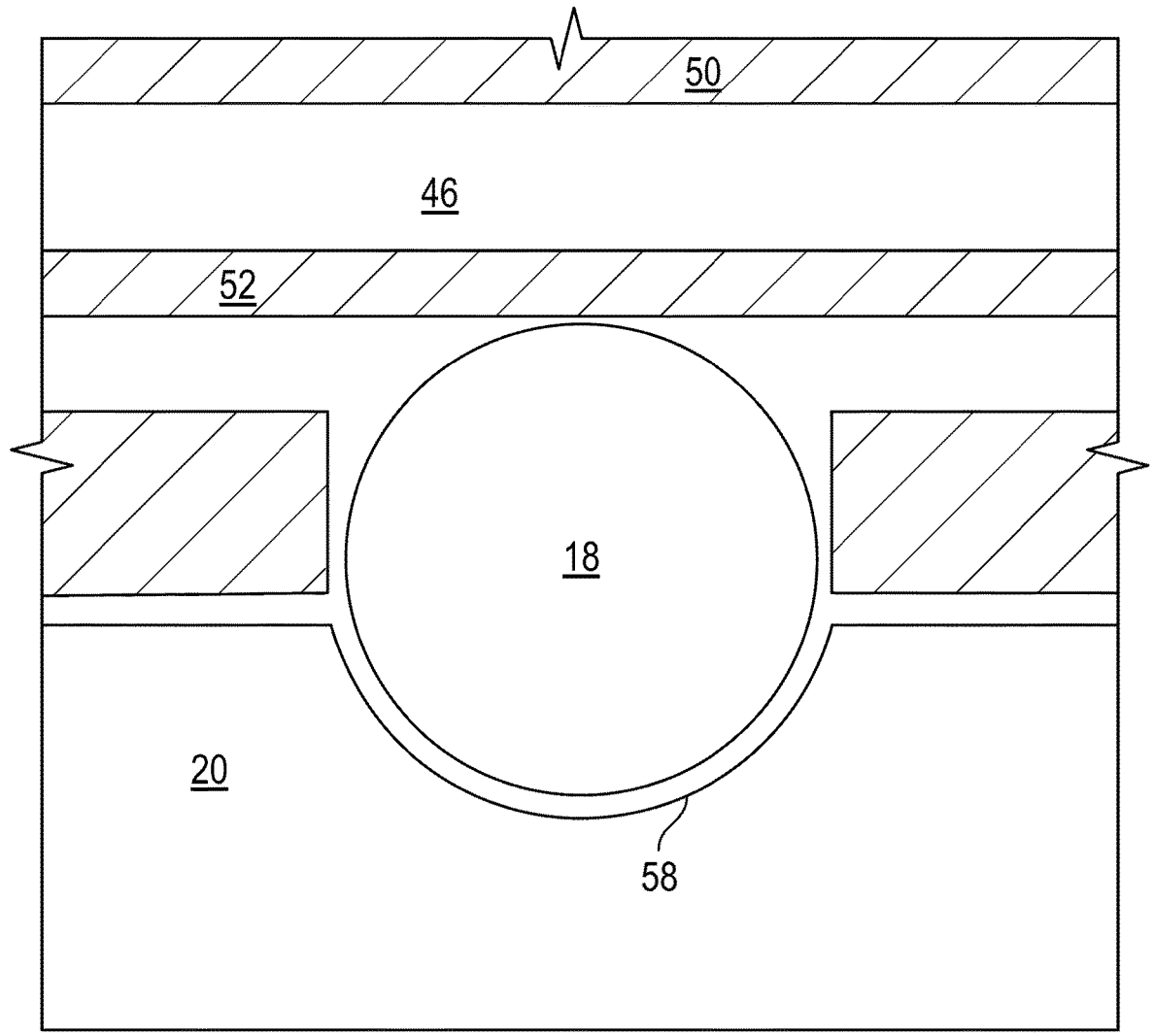
Figure 16:
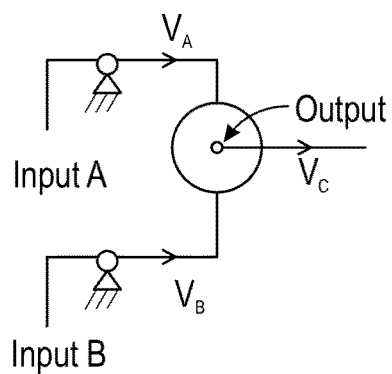
Figure 17:
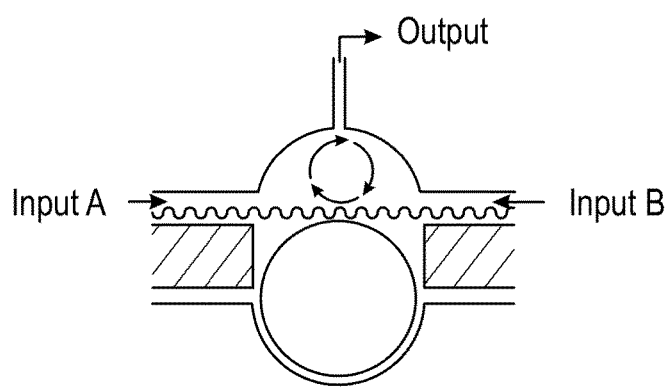
Figure 18:
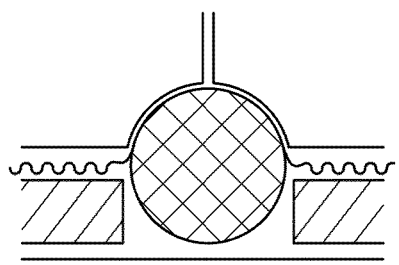
Figure 19:
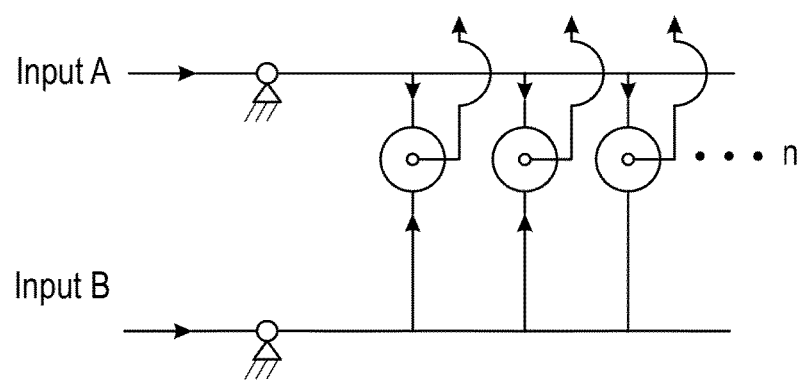

FIG. 10 schematically shows an alternative arrangement for the valve of the present invention;

FIG. 11 shows a similar embodiment of the apparatus, showing the drive head within a clamping plate;

FIG. 12 shows in more detail the ball bearing and groove of FIG. 11;

FIG. 13 shows the valve of FIG. 12 in its open configuration, with the ball bearing sitting in the rotated groove;

FIG. 14 schematically shows a prior art microvalve in its closed condition;

FIG. 15 schematically shows the microvalve of FIG. 14 is open condition;

FIG. 16 shows an alternative arrangement with two inputs into a cup, one from either side;

FIGS. 17 and 18 show an example of that cup of FIG. 16 in open and closed conditions respectfully; and FIG. 19 shows a series of such microvalves.

Figure 1:
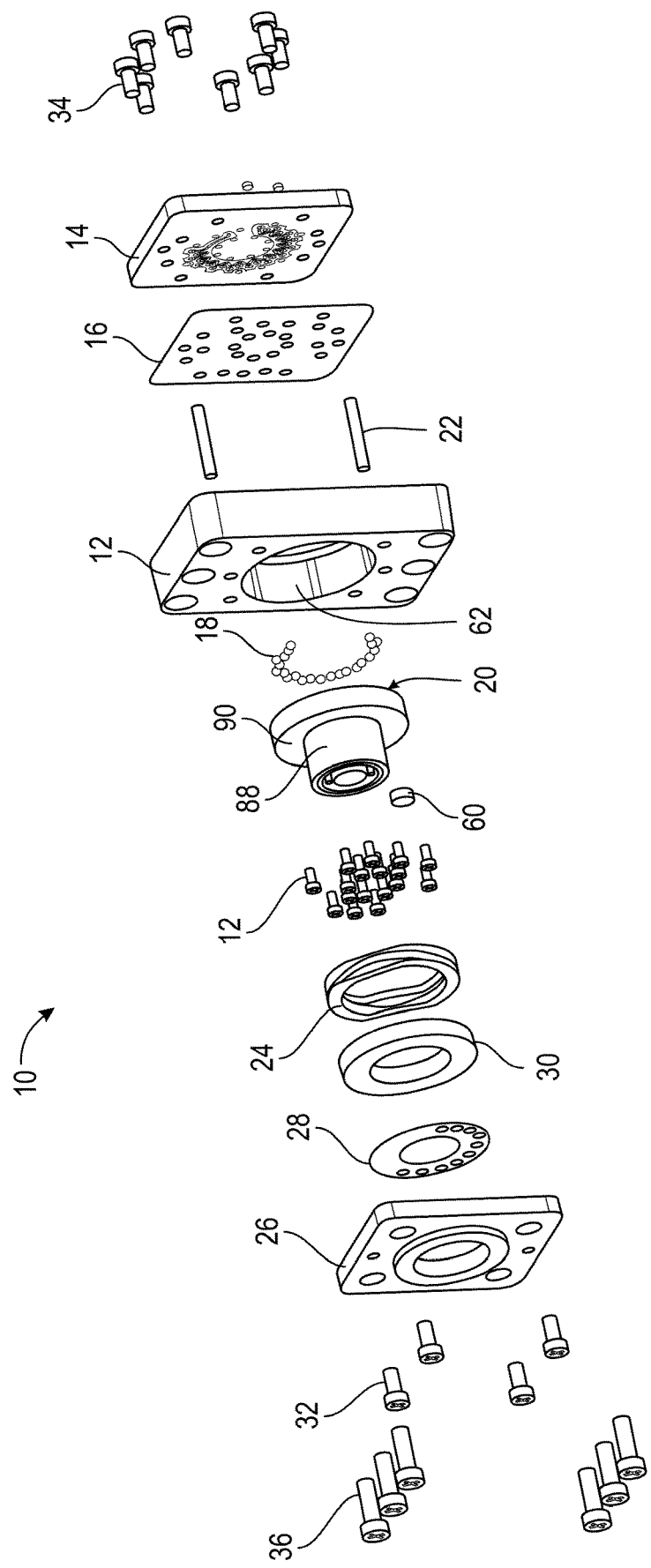

Referring first of all to FIG. 1, a first embodiment of the present invention is disclosed in exploded perspective view. This embodiment relates to an apparatus containing 25 microvalves, each microvalve being likewise in accordance with an aspect of the invention.

The apparatus provides a flow switch to control flow from an input sequentially across and out through multiple outflow ports. Such a product can have many uses, including pre-clinical drug testing.

As can be seen in FIG. 1, the apparatus 10 comprises a main manifold 12. The main manifold 12 comprises an approximately rectangular main body, with rounded corners and bolt holes 64 in the end regions. The bolt holes can receive bolts 36 for mounting the apparatus 10 onto other equipment.

Figure 3:
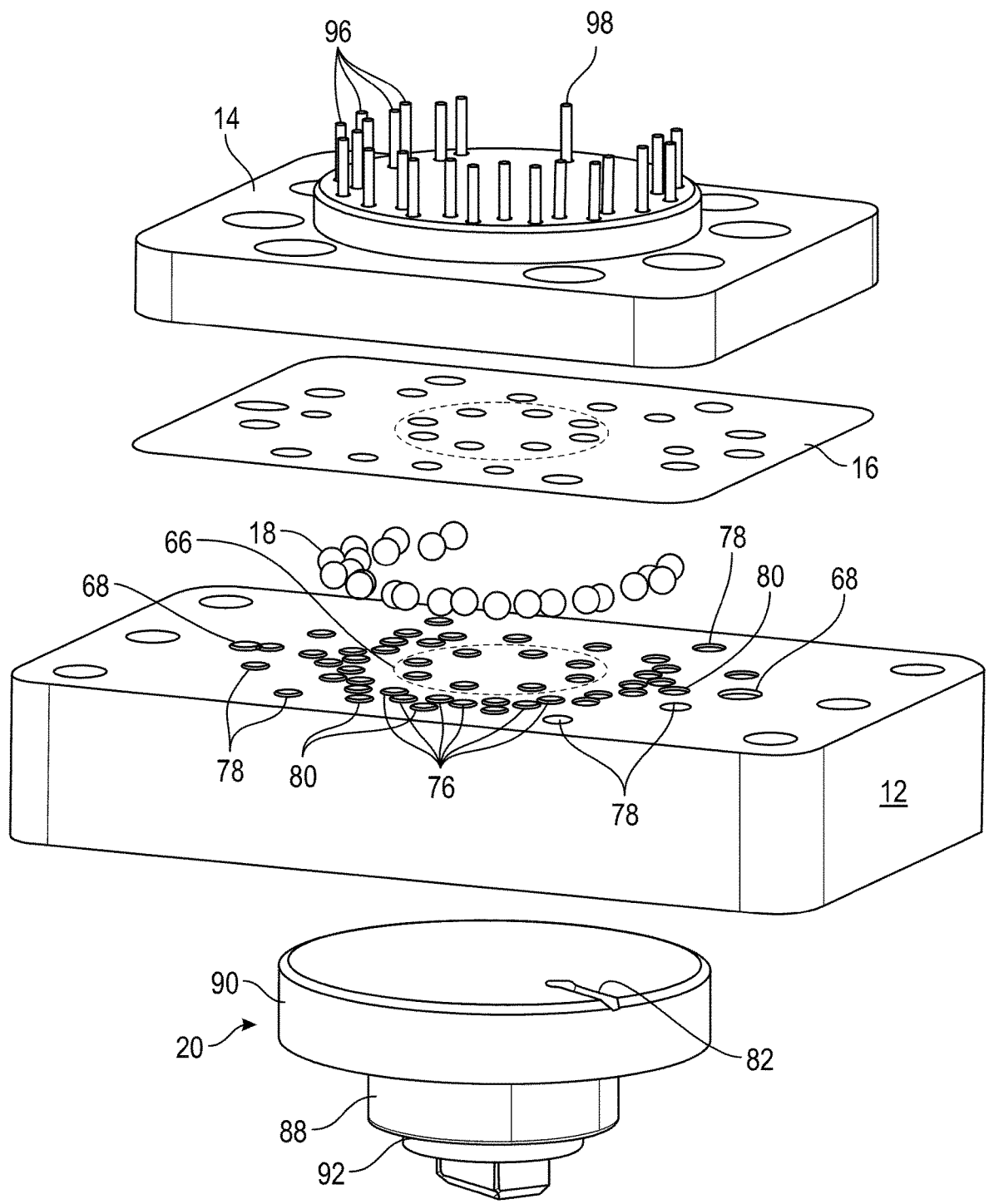

The manifold also has a recessed area in its centre defining part of a clamping plate 12 for a hard base 14. The rest of the clamping plate for the hard base 14 is part of the manifold 12 surrounding the recessed area 62—on the side facing the hard base 14. As can be seen in FIG. 3, this clamping plate has an inner ring 66 of eight bolt holes and a further middle ring 80 of nine bolt holes (not all are shown to avoid overcrowding the image), all aligned with the recessed area, and an outer ring 78 of eight bolt holes overlying the main body of the manifold. These are the preferred number for a bolted together product, although other quantities, would instead be permissible.

In addition there are two alignment peg holes 68 for accommodating respective alignment pegs 22—See FIGS. 1 and 3.

Figure 7:
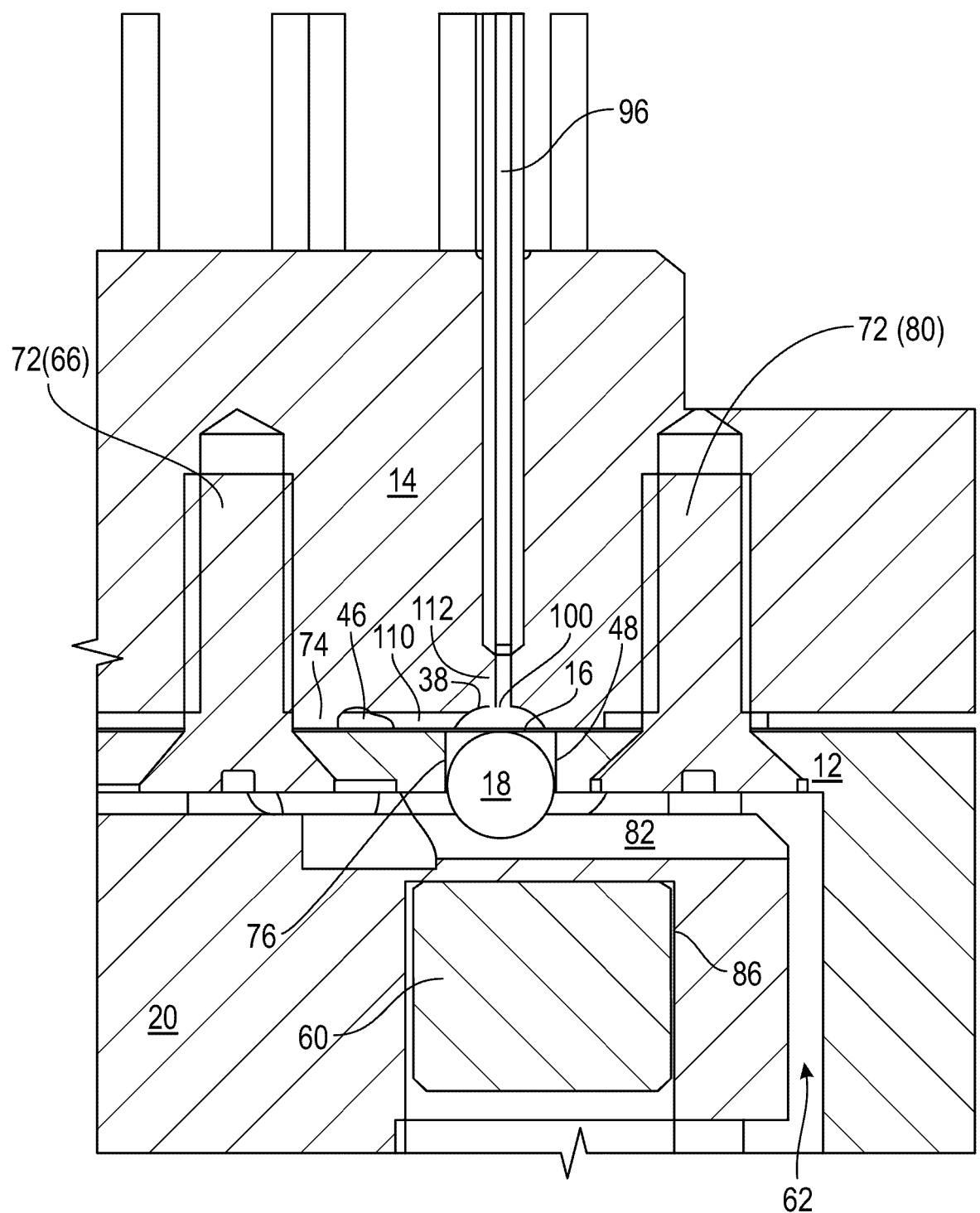
FIG. 7 shows a different section through the open valve in the apparatus.

All these holes align with corresponding holes in the hard base, although the holes for the inner and middle rings are blind holes, with their openings facing the manifold 12 to receive channel bolts 72 that are inserted via the recessed area through to the hard base. As can be seen in FIG. 7, these channel bolts 72 are recessed into the back of the clamping plate 12 to be flush therewith when the apparatus is correctly assembled.

The outer ring of bolt holes are instead attached to the manifold by bolts inserted through the hard base and screwed into the manifold. The alignment pegs ensure everything is aligned properly.

Between the hard base 14 and the manifold or clamping plate 12 is also provided a thin membrane 16, which thin membrane 16 is tightly retained by the channel bolts against a channeled region 74 of the hard base 14 to define closed channels. It has holes corresponding to those for the inner, middle and outer rings of bolt holes, and for the alignment pegs.

The channels will be described further below.

As shown in FIG. 3, in addition to the inner 66, middle 80 and outer 78 rings of bolt holes, a partial, staggered, ring of through holes 76 are provided in the clamping plate 12, again overlying the recessed area 62. These are for receiving ball bearings 18. These ball bearings 18, along with the thin membrane 16, form components of the various microvalves, as also will be described further below. For this reason the thin membrane does not have holes corresponding to these through holes.

In FIG. 3, the ball bearings 18 are shown between the clamping plate and the thin membrane, whereas in FIG. 1 the ball bearings 18 are on the other side of the manifold. This is because the through holes 76 will allow through passage of the ball bearings 18 before assembly.

The ball bearings 18, upon assembly, will each be retained in their respective through hole 76 by a drive head 20. As can be seen in FIG. 1, the drive head 20 is arranged to be inserted into the recessed area 62 for that purpose. The face of the drive head 20 that faces the ball bearings has a radial groove 82 in it sized to allow a ball bearing 18 to fall slightly into it. It also has ramped sides 84—see FIG. 8—to allow rotation of the drive head 20 to allow the ball bearing 18 to raise out of the groove 82.

In the area of the groove, a magnet 60 is optionally provided in the drive head 20. For example, as seen in FIG. 7, the magnet can be inserted and glued into a flat-bottomed hole 86 provided in the drive head 20. Other forms of attachment, such as screwthreads, can alternatively be used.

V-shaped grooves can be provided, although round-bottomed grooves may be provided instead.

In this embodiment, the drive head is round with a cylindrical stem 88 and a circular flange 90 extending around its end nearest the ball bearings 18 to provide the surface that engages the ball bearings 18. Preferably that face of the drive head 20 is substantially flat other than the groove 82, although there can be more than one groove, especially where there are two fluid circuits within the apparatus, e.g. as in the embodiment of FIG. 9.

Figure 2:
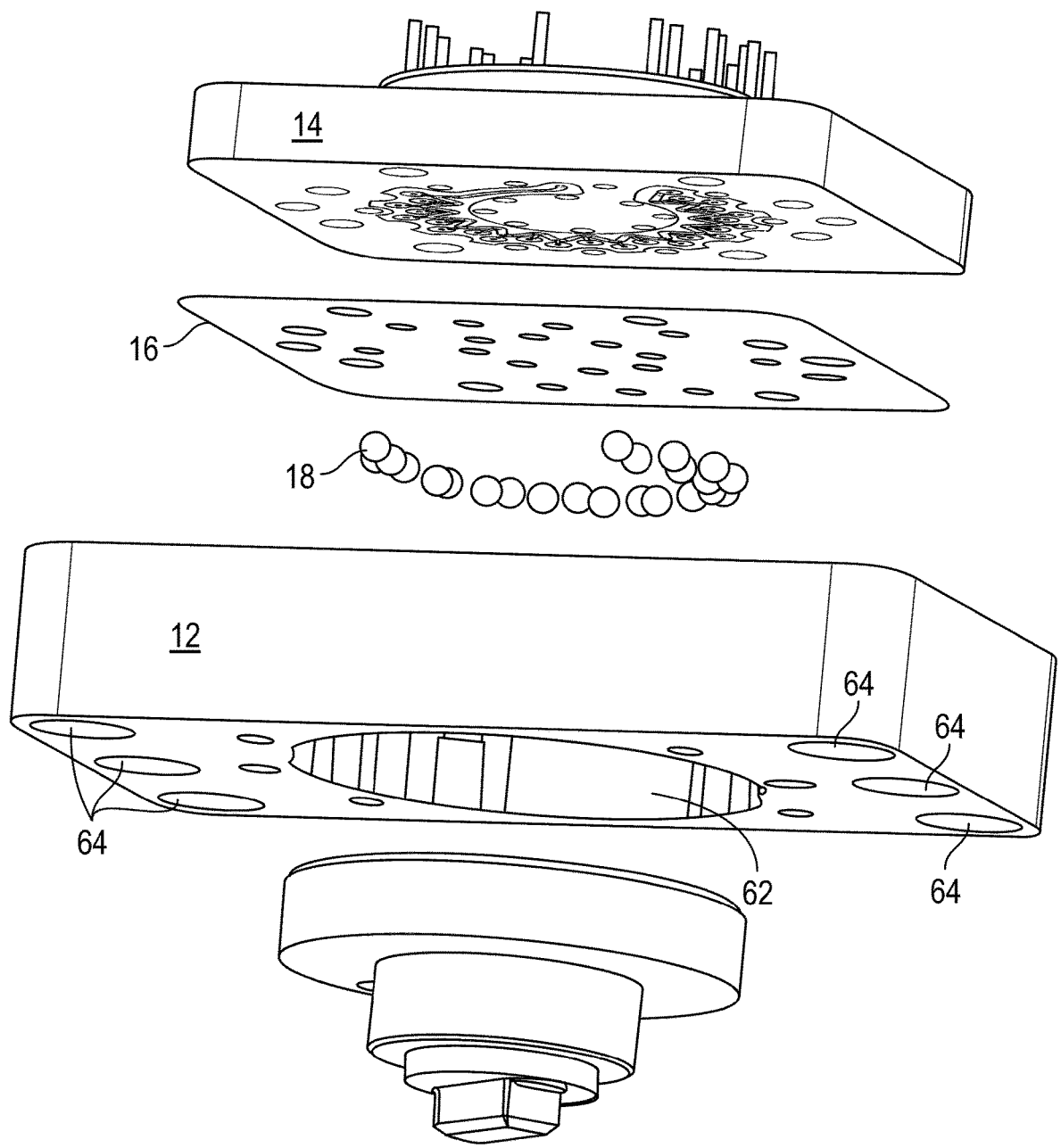

The cylindrical stem has a free end that has a torque engagement member—in FIG. 2 this is a square end. Other arrangements are alternatively (or additionally) possible. This end is for engagement by a motor for controlling the apparatus. That aspect of the invention is known in the art, and thus needs no further discussion To maintain the force of the drive head 20 against the ball bearings 18, a ring-spring 24 surrounds the stem. This bears against a bearing 30 (preferably a roller bearing), which in turn bears against a dial 28, which dial can be affixed to the stem by having a smaller diameter hole in its centre. It thus attached to the shoulder 92 of the stem 88, which shoulder can be seen in FIG. 3.

A cover 26 then completes the assembly by having a hole for loosely surrounding the shoulder 92, which hole has a see-through ring 94 around it for viewing the dial. Thus the state of rotation of the drive head 20 can be seen.

Finally this cover is bolted also to the manifold by in this case 4 bolts 32. Again for alignment the cover 26 has holes for the alignment pegs, which can be removed or left in the assembly once the apparatus is fully bolted together.

Figure 4:
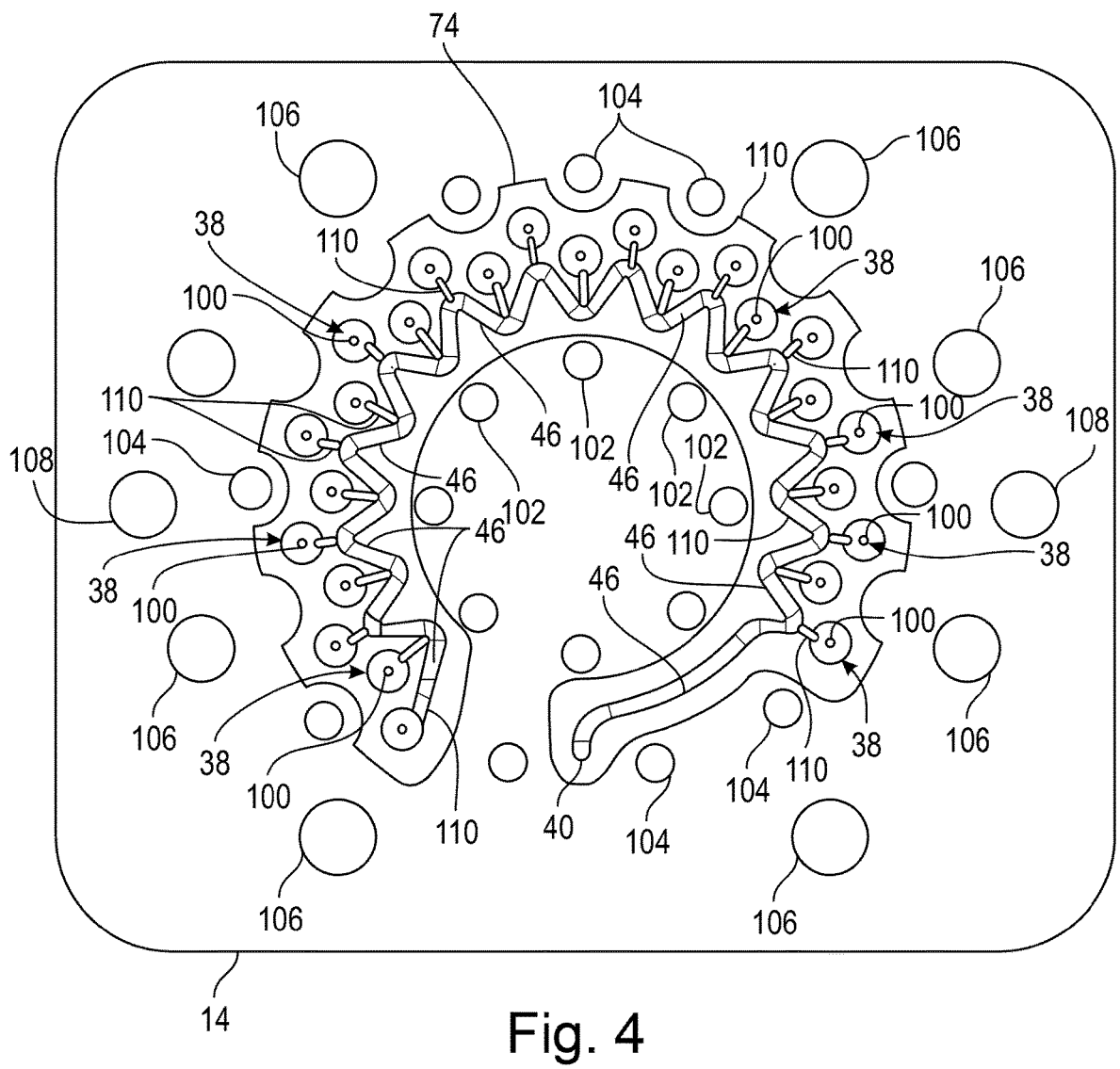

Referring next to FIG. 4, further details of the channeled region 74 will be discussed. As can be seen, the channeled region in this embodiment is a plate rebated into the ball bearing facing surface of the hard base 14. It is formed with a hard working surface to provide long-term use. In its surface, a tortuous channel 46 is provided for distributing fluid around the channeled region 74. This fluid channel 46 has an input end 40 which is for input of fluid into and along the channel 46, which connects to saw tooth or zigzag elements zigzagging around the majority of the channeled region—herein between 245 and 280 degrees of the channeled region 74, by a length of substantially accurate channel. In the zigzag portion, outward teeth are associated with radially outward extending channels 110 leading to a first set of valve cups 38 and inward troughs of the saw tooth being likewise associated with radially outward extending channels 110 leading to an additional set of valve cups 38 that are staggered radially inward relative to the first set of valve cups 38. As a result of this staggering of the valve cups 38, around that majority of the channeled region, the channeled region 74 comprises 25 valve cups 38, with an outer set of 13 cups and an inner set of 12 cups. A linear string of cups is instead possible if preferred, although the cups should stand off from the main channel, for which purpose the radially outward extending channels 110 are provided. As such, the cups 38 are all fluidly connectable to the inlet 40 even when the preceding cups are blocked.

Regarding that blocking, each of these cups 38 are a part of the valves of one aspect of the invention. Each cup 38 is sized to receive a portion of its respective ball bearing 18 to sandwich the overlying portion of the thin membrane 16 inside the cup 38. At a centre (or base or bottom), of each cup, but in most uses at the uppermost area, there is a port 100, connected, as shown in FIG. 3, to exit pipes 96. Thus, pressing the ball bearing and the thin membrane into the cup closes that port 100, thus making the cup 100, thin membrane 16 and ball bearing 18 work together as a valve ("microvalve"), sealing closed the port from the fluid channel 46 extending around the channeled region 74. As described elsewhere, the ball bearing would also be able to seal closed, with the membrane, a port that is non-centrally arranged too, but in this embodiment it is centrally arranged in the cup.

A further input pipe 98 is also shown in FIG. 3. It connects to the input end 40 of the channel 46. Thus, from the outer side of the hard base 14, delivery pipes can be connected to those input and exit pipes 96, 98, to allow the apparatus to control which exit pipe fluid entering through the entry pipe exits through.

As there is only a single groove 82, only one ball bearing 18 is not forced against the thin membrane 16 and its respective cup 38. Thus, fluid flows through that one non-sealed cup and the port 100 therein, for delivery elsewhere through its exit pipe 96.

As also seen in FIG. 4, corresponding inner, middle and outer holes 102, 104, 106, corresponding to the inner, middle and outer rings 66, 80, 78 can be seen. Likewise, two holes 108 for the alignment pegs 70 can be seen, which likewise align with the corresponding peg holes in the cover 26, manifold 12 and thin membrane 16. The corresponding inner holes 102 are arranged radially internal relative to the channeled region 74, whereas the nine corresponding middle holes 104 are nearly all external of the channeled region 74. One of those bolt holes, however, is positioned between the two ends of the channeled region 74. Other arrangements though are permissible—to match that of the other components.

Spaced further outward are the corresponding outer holes, which are larger to accommodate a large bolt size, plus the two alignment pin holes, which are located centrally near the short ends of the rectangular hard base.

Shapes other than rectangular would be possible for each of the cover, manifold, thin membrane and hard base.

The channeled region may be a separate component bonded into or onto a back plate, but in this embodiment it is instead simply an area that sits proud of the rest of the hard base, as an integral part thereof. Of course, it needn't be proud of the rest of the base—it can be flush, or even recessed, so long as the membrane and drive head sits suitably against it to create the necessary seals for achieving the functionality described herein.

The external shape of the channeled region 74 is generally circular, albeit an incomplete circle with scooped areas generally equally spaced around much of the circumference, with the scoops' positions corresponding to some of the holes that correspond to the holes of the middle bolt hole ring 80. The scoops allow both the inner ring and the middle ring of holes to be arranged close to the cups 38 of the valves, thus allowing the bolts, when tightened, to provide a strong clamping force against the thin membrane 16 between the clamping plate of the manifold 12 and the hard base (i.e. the channeled region 74 thereof). Thus the thin membrane 16 clamps tightly against the cups' surrounding lips, and likewise against the upper edges of both the main channel 46 on the channeled region and the radially extending channels 110 that extend from the main channel 46 to the cups. With that tight compression, the thin membrane holds against those edges as well as the surrounding area of the channeled region, thus providing a tight seal over the full extent of those channels 46, 110 and cups 38, thus forming defined fluid conduits from those channels and cups leading all the way from the entry port 40 to each of the cups 38, and out through the port 100 in one of the cups 38 when the valve of that cup, formed by further compression of the thin membrane 16 within the cup 38 to close the port 100 thereof, is released by the ball bearing 18 being aligned with the groove 82 of the drive head 20.

As the drive head 20 has only the one groove 82—herein a radial groove, but possibly just an angled-walled recess, as mentioned above all the other ports 100—in the other cups 38—remain closed until the groove is moved round to them, i.e. each can be opened individually, while the others are then closed.

The cups in this embodiment effectively provide two concentric rings of cups, each being a somewhat closed C shape (c. 275 degrees in this example). The inflow is in the "open part" of the C. Other angles for the ring are permissible, including closed (e.g. the embodiment of FIG. 9, as will be discussed later), or 180 degrees, as seen in one half of the embodiment of FIG. 9, or any angle.

Figure 9:
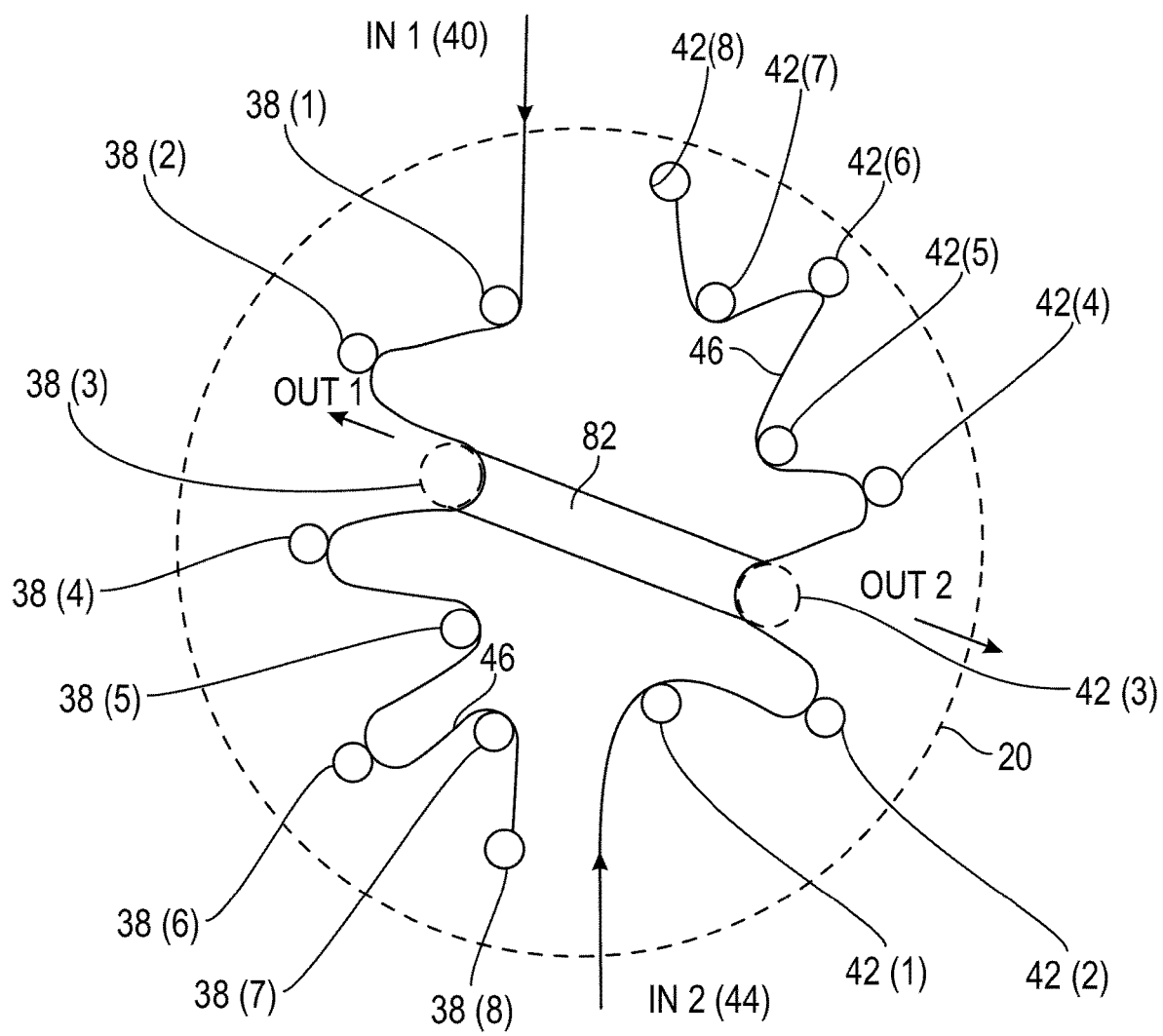
FIG. 9 shows a variant apparatus having two separate, but operably linked, directable fluid circuits each with one input line and eight output lines.

Circular also isn't essential—there can be many different arrangements for the cups, whether so as to open individually, or as more than one at once using an elongated groove (and radially aligned cups for a rotating drive head design), or more than one groove—the latter being shown in FIG. 9.

Referring next to FIGS. 5 to 8, the arrangement of the valve of a first embodiment, and its mode of operation by the groove, is shown in closer detail.

Figure 5:
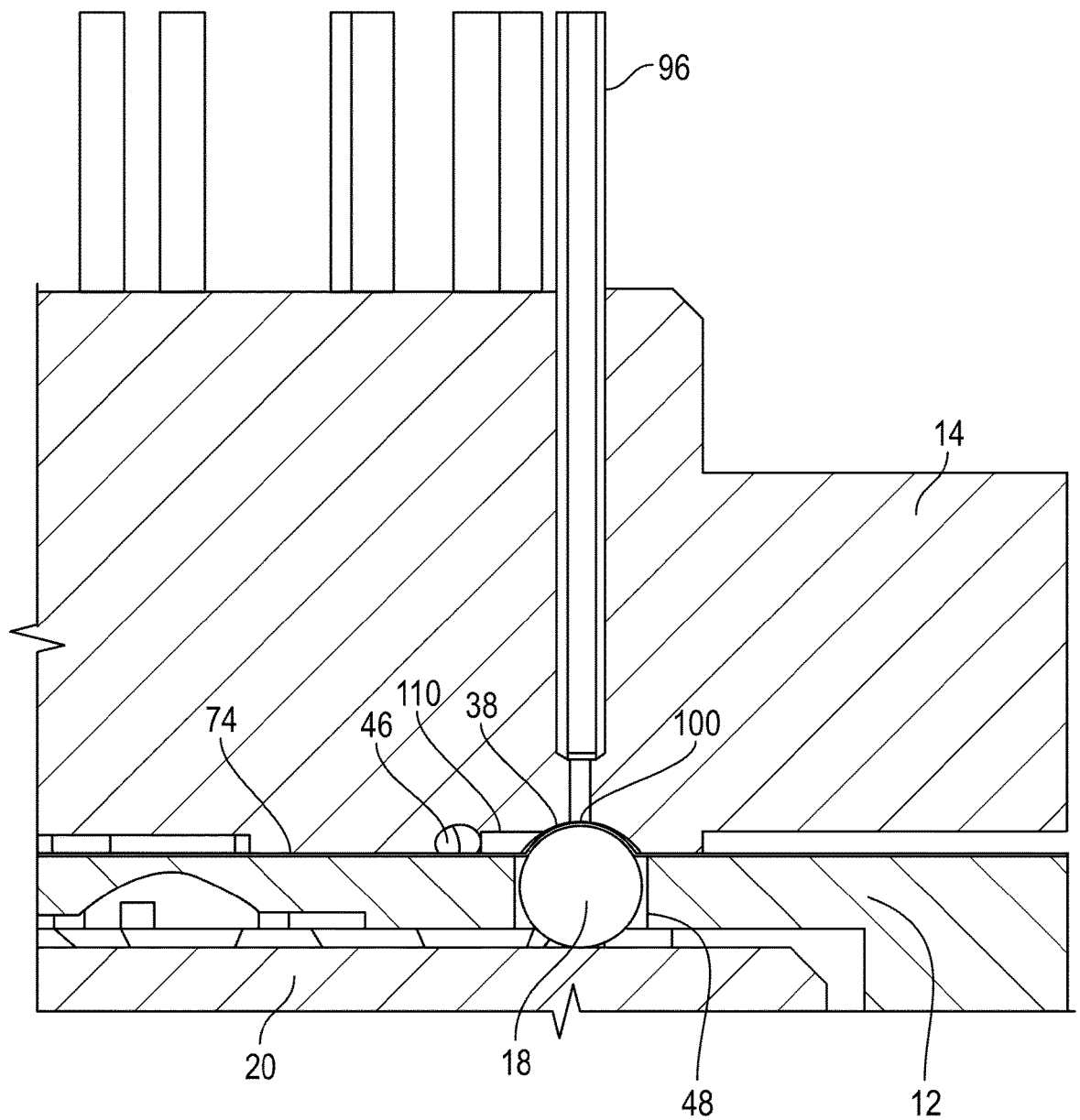

As can be seen in FIG. 5, the drive head 20 is holding the ball bearing 18, which sits in a ball bearing hole 48 of the clamping plate 12 in a condition in which it extends into the cup 38 in the channeled region 74 of the hard base 14. In this condition, the valve closed condition, fluid running through the channel 46 and into the radially extending channel 110 is prevented from reaching the port 100 of the cup 38, whereby it cannot exit from the apparatus up through the exit pipe 96.

Figure 6:
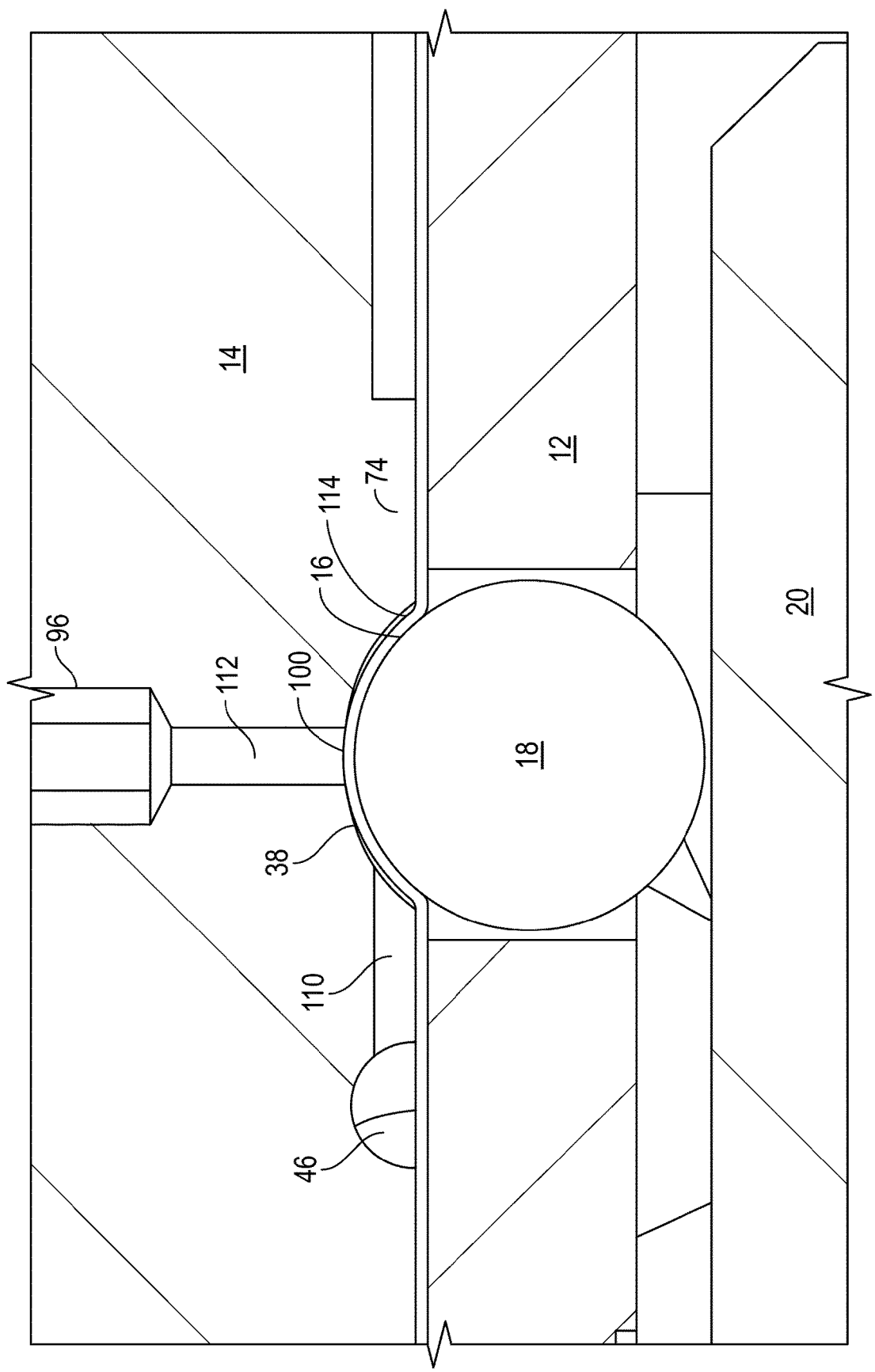
FIG. 6 shows in greater detail the closed valve.

Referring then to FIG. 6, a closer view of the valve is provided. As can be seen, the thin membrane 16 is clamped between the channeled region 74 and the clamping plate 12 to thus close the base of the channel 46 and the radially extending channel 110. However, because of the insertion of the ball bearing 18 into the cup 38 the flexible membrane 16 extends up into the cup to squeeze against the cup 38 at least in the region of the port 100, thus closing the port 100. Thus fluid in the radially extending channel 110 cannot reach a pilot tube 112 above the port 100 to gain access to the exit pipe 96 for exiting the apparatus. This closure of the valve thus results from the ball bearing 18 bearing against the flat part of the drive head 20, rather than in the groove 82 therein.

Referring next to FIG. 7, this is still a section through a valve but this time the section is through the radial groove 82 while the groove 82 is coincident with a ball bearing. This ball bearing is still located in a ball bearing hole 48 in the clamping plate 12. However, as the ball bearing aligns with the groove, it can fall under the influence of gravity into the groove to rest on one or both of the slanted side walls of that groove 82. Due to the shape of the groove, in this embodiment it does not descend all the way into the groove 82.

This orientation of the apparatus (the ball bearing above the drive head and below the cup, is best to ensure that the ball bearing falls into the groove. It should be appreciated, however, that the elastic force of the membrane and the fluid pressure in the channel should push open the valve anyway, by pushing the ball bearing into the groove (by pressure acting on the thin membrane) and the elasticity of the membrane, even if the apparatus was differently orientate—even if it was on its side or upside down.

As discussed elsewhere, in this embodiment a magnet is provided as well in the drive head to help encourage the ball bearing to exit the cup.

Given the change in the angle of the sectional view, we can now see one of the bolts 72 of the inner ring of bolts 66 and one of the bolts 72 of the middle ring of bolts 80. As can be seen, these bolts 72 are either side, relatively, to the cup. This ensures securement of the thin membrane across the cup.

It should also be noted that the bolts' heads are countersunk to be flush relative to the underside of the clamping plate 12 to ensure that the bolts' heads do not interfere with rotation of the drive head 20.

Because the ball bearing 18 has dropped into the groove 82, it has fallen out of the cup 38, thus allowing the thin membrane 16 to flex back into its flat configuration, thus opening that port 100. As the port 100 is open, fluid flowing through the channel 46 and thus then the radially extending channel 110 can enter the cup 38 and exit up through the port 100 and up through to the exit pipe 96. The other ports—without a groove 82—would remain in (or return to) the condition of FIGS. 5 and 6.

Figure 8:
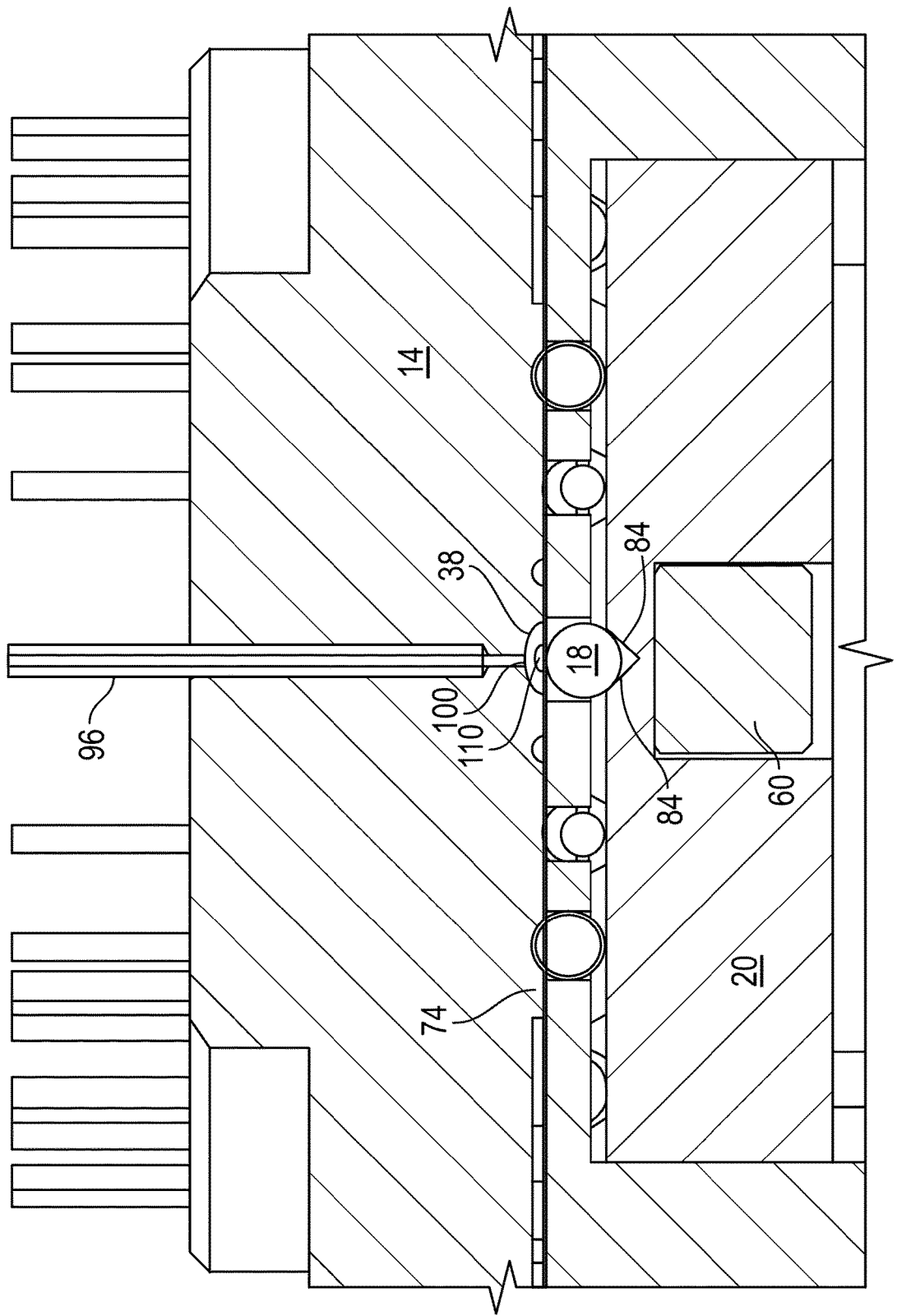
FIG. 8 shows a perpendicular section relative to that of FIG. 7, still through the open valve in the apparatus.

Referring then to FIG. 8, the arrangement of FIG. 7 is shown from a perpendicular section therefrom such that the magnet 60 is now substantially centrally positioned in this view of the drive head 20, rather than towards its edge as seen in FIG. 7. Likewise, the V of the groove 82 can be seen, and thus the two angled sides 84 are noted. By having angled sides, upon rotation of the drive head 20, the ball bearing 18 will tend to lift out of the groove. Upon that lifting, it once again closes the valve of the cup 38, by flexing the thin membrane up against the port 100 of the cup 38, thus closing off access to the port 100 for the radially extending channel 110.

Although the port 100 in the cup is shown to be centred at 90 degrees relative to the hard base's flat surface—i.e. an uppermost position given the orientation of FIGS. 5 to 8, the port can be positioned away from that uppermost location. It is preferably centred at an angle relative to the radial centre of the ball bearing, when the ball bearing is in its default closed position, of between 45 and 135°, inclusive, and more preferably at an angle between 70 and 110°, or even 80 to 100, inclusive. Going further than 45 to 135 degrees can be possible, but is less preferable as the finite thickness of the thin membrane makes such angles difficult to seal with the ball bearing's movement against that membrane, although deepening the cup would address that.

The radially extending fluid channel in this embodiment enters the cup at between 30 and 50 degrees when measured from that same centre of the ball bearing, but that too can be more or less depending on the thickness of the membrane and the depth of that radially extending channel.

In this embodiment the radially extending channel is shallower than the main channel 46, although this isn't essential. Likewise channels other than radially extending can be provided.

It is possible also to measure with respect to the path defined by the lower wall of the channels 46, 110, i.e. the flat underside of the thin membrane. Ideally the port would be angled still at 90 degrees, but angles of up to 50 degrees from that centre would certainly be possible, with wider angles being again harder to seal. Angling up on the opposite side of the cup to the radially extending channel 110 is typically easier to seal at lower positions, but taking that to zero (i.e. providing a linear fluid channel across the valve, as in the prior art), does not seal completely with the design of the present invention because the elastomeric membrane leaves an opening or gap 114 around the lower part of the cup—see FIG. 6. This is to better enable seating of the ball bearing in the cup from a valve open position during fast use of the apparatus, (i.e. rapid rotation of the drive head) and to minimise pinch-cutting of the thin membrane against the edge of the cup.

Referring next to FIG. 9, an alternative arrangement for the cups 38 is shown. In this embodiment, for simplicity it is only shown schematically, as we only look at lines for the channels 46 and grey spots for the cups 38, and further lines for the in and out pipes. There are only 16 cups in this embodiment. Further there are two separate channel systems, rather than just one, as per the previous embodiment. A first channel system is supplied by a first in feed 40 and a second channel system is fed by a second in feed 44. The separate channels and cups then accommodate opposing halves of apparatus. With this arrangement, by using a common drive head 20 having two grooves 82, there can be a selection of two output lines, one for each input of the two channel systems. Thus, each channel system has 8 cups, in two arcs, each of which cups can be selected, long with a diametrically opposing cup of the other channel system (due to the grooves 82 being aligned across the centre of the drive head 20.

Due to the presence of only 16 cups in total, compared to the 25 of the first embodiment, the size of the drive head of this second apparatus can in theory be smaller (smaller diameter in this instance) than that of the previous embodiment. However, actual sizing of the drive head 20 depends on the spacing between the cups and the sizes of the cups.

As with the previous embodiment, the channel 46 extends in a zigzag pattern around the cups alternating between the rings, whereby there are still inner and outer rings of cups, as previously. However, in this second embodiment, the radially arranged channels are much shorter, or substantially not present due to the proximity of the peaks and troughs of the zig zags to the cups.

In this embodiment, the two zig-zag distribution channels of each separate channel approximately mirror each other.

Other arrangements are of course also possible.

Referring next to FIG. 10, an alternative valve arrangement is shown. The attachment of the thin membrane in the valve is slightly different. In this embodiment, a separate clamping plate 122 is provided between a manifold and the hard base 14. Thus, a screw or bolt 124 may be more directly associated with each cup 38. In this embodiment the screw 124 attaches and clamps the thin membrane 16 to the channel region of the base 14 via a separate clamping plate.

The port 100 in this design is still at the top of the cup (in the illustrated embodiment, with the ball bearing under the membrane), although as discussed previously it can be placed elsewhere around the cup. A radially arranged channel 110 is again provided to feed fluid from the input 40 and main channel 46 to the cup 38.

In this illustrated embodiment, the ball bearing is pushed into its valve closed condition by the drive head 20. However, rotation of the drive head can bring a groove, in this case a rounded groove 182 instead of a V groove, into a position underneath the ball bearing 18 to allow opening of the valve, much like before.

It is also to be noted that although rotation of the drive head 20 is typically the preferred mode for switching between the valves in a sequence of valves, due to the ability to keep rotation, arranging the cups in a linear manner, and having a sliding arrangement for a drive head could be provided. That linear movement for the drive head could even be used with zigzag cups, or multiple lines of cups, as per the previous embodiments, so long as the cups extend along the general direction of the linear movement.

As in the previous embodiment, a spring 24 biases the drive head 20 into engagement with the ball bearing 18 so as to push the thin membrane upland against the port 100 to close it.

Due to the presence of the thin film between the ball bearing and the cup, the radius of the cup will generally have a radius that is at least the thickness of the thin membrane bigger than the radius of the ball bearing. Typically it is at least 1.1 times the thickness of the thin membrane bigger radius of the ball bearing to provide the gap 114 as previously discussed. As a result, the bearing will be able to squeeze the thin film against the port without tearing the film on the edges of the cup, as in the previous embodiment.

Referring next to FIGS. 11 to 13, a further embodiment is shown, which is largely similar to that of FIG. 1. In this embodiment, like the first embodiment, the drive head 20 is driven towards the thin membrane to compress it against the clamping plate part of the manifold 12 by a ring spring 24, and as seen in FIG. 13, the ball bearing 18 is able to drop out of a valve closing position into a groove 82 in the hard base 14 to open the valve. In FIG. 13, a second ball bearing (just the bottom thereof, is also seen—to the right of the dropped ball bearing. From its base it can be recognised to have not fallen from its valve closing position (as its bottom still sits on the flat portion of the drive head, rather than in a groove 82). That closed position of the valve is shown in FIG. 12.

In FIG. 13 the radially extending groove 110 becomes visible as the valve is open. As such fluid can pass through the valve and out through the pilot tube 112.

In FIG. 12, the radial extending grooves 110 of two other valves, either side of the visible sealed valve, can be seen due to the line of the section. The one on the left is the open valve of FIG. 13, as can be determined by the presence of the groove 82 under it. The one on the right, hover will also be a closed valve.

In these closed valves, the membrane 16 bends around the top of the ball bearing 18 and is pressed against the port 100 to seal the port 100 of the cup 38.

This embodiment is provided to illustrate the drive head 20 inserted in a recessed area 62 in the manifold 12, with the ring spring 24 behind it, surrounding the stem 88. Further, the washer 30 is behind that ring washer 24, with a dial 28 inserted in a recess of the washer 30 so that the cover 26 can press it all together. See FIG. 11. As in FIG. 1, although not seen the stem can interface with a drive means, such as by way of an interface for a motor with a spindle.

Referring next to FIGS. 16 to 18, an alternative arrangement for the inflow into the cup is provided for achieving an additional optional function. In this embodiment there are two inputs and one output per cup. The output, as before is central to the cup 18, but needn't be as previously, whereas there are two pumped inputs A, B in the sides, which again needn't be. As a consequence the channels in this embodiment, instead of circulating around the cups, are provided local to each respective cup, so each cup has these three lines in/out. The drive head thus can still be below a ball bearing with a membrane between the ball bearing and the cup as before.

As the rotating groove of the drive head starts to open the port, provided by the output, the fluid from the two pumped inputs are allowed to fill the volume of the cup, thus mixing in the cups before exiting out through the output line. Thus in this embodiment selective mixing can occur in each cup before feeding out through a respective output.

Of course there can be just one cup with the drive head selectively controlling it, but more usually there will be more than one cup each with its input lines and its output line.

With this arrangement it is even possible to mix more than two liquids by having three or more inputs, whereupon on opening the valve all three will be mixed.

Referring finally to FIG. 19, instead of having the separate mixing cups around a ring for controlling by rotation of the drive head, a serial and linear arrangement is shown. Here there is a common input and output to each cup—three cups are shown but this can continue for more as signified by the dots. Each cup also has an output for delivery out of the cup to different targets—herein wells. A linear drive head would sequentially move to operate the cups in turn.

It is also anticipated in this figure that this arrangement would also work by curving the arrangement around in a circle, to thus be accommodated in a circular arrangement, much like the first embodiment, with two channel rings around the arrangement, one for each input A and B.

These and other features of the present invention have therefore been described above purely by way of example. Modifications in detail made to the valve and apparatus, and other aspects of the invention, within the scope of the claims as appended hereto.

The invention claimed is:

1. A microvalve comprising a hard base, a clamping plate, an inlet port, an outlet port, a membrane, a ball bearing and a drive head; wherein the hard base comprises a recess over which the membrane is clamped by the clamping plate, the recess defining a cup with a generally spherical cap shaped surface and a perimeter, both of the inlet and outlet ports being in the recess, and at least one of them being in the generally spherical cap shaped surface;

the membrane extends across the recess and beyond the perimeter, whereat it is clamped, and is flexible for enabling the unclamped part of it to be flexed into the recess;

the ball bearing is arranged opposing the recess, in the clamping plate on the other side of the membrane to the recess; and the drive head is behind the ball bearing for selective driving of the ball bearing against the membrane to flex the membrane into the recess as the membrane flexes around part of the ball bearing to move the membrane from a condition in which both ports are open to a port closing condition, the port closing condition being where the membrane has been flexed to extend over either one of, or alternatively both of, the input port and the output port, and clamped thereagainst by the ball bearing to close at least that one port.

2. The microvalve of claim 1, wherein the generally spherical cap shaped surface has a radius larger than the radius of the ball bearing.

3. The microvalve of claim 1, wherein one of the ports is in the centre of the cup.

4. The microvalve of claim 1, wherein there are two or more inputs and at least one output.

5. The microvalve of claim 1, wherein the clamping of the membrane between the hard base and the clamping base is by screwing or bolting the clamping plate to the hard base with the membrane between them.

6. The microvalve of claim 1, wherein the hard base has at least one channel recessed into its membrane facing surface, the membrane extending across such channels and the clamping plate's membrane engaging face engaging the membrane against the sides of those channels, whereby, upon the compression of the membrane along those sides, one or more fluid channel is defined.

7. The microvalve of claim 1, wherein the drive head has a forward surface with a groove in an otherwise flat surface.

8. A multi-directional valve apparatus comprising a plurality of microvalves comprising a hard base, a clamping plate, an inlet port, an outlet port, a membrane, a ball bearing and a drive head; wherein the hard base comprises a recess over which the membrane is clamped by the clamping plate, the recess defining a cup with a generally spherical cap shaped surface and a perimeter, both of the inlet and outlet ports being in the recess, and at least one of them being in the generally spherical cap shaped surface;

the membrane extends across the recess and beyond the perimeter, whereat it is clamped, and is flexible for enabling the unclamped part of it to be flexed into the recess;

the ball bearing is arranged opposing the recess, in the clamping plate on the other side of the membrane to the recess; and the drive head is behind the ball bearing for selective driving of the ball bearing against the membrane to flex the membrane into the recess as the membrane flexes around part of the ball bearing to move the membrane from a condition in which both ports are open to a port closing condition, the port closing condition being where the membrane has been flexed to extend over either one of, or alternatively both of, the input port and the output port, and clamped thereagainst by the ball bearing, wherein the microvalves have a common drive head, but separate ball bearings and cups in each microvalve, and the multi-directional valve apparatus has a fluid line around and connecting to all of the microvalves, the microvalves being arranged for sequential activation by movement of the common drive head to selectively retract one or more ball bearing of the microvalves to selectively open the port(s) of that microvalve.

9. The multi-directional valve apparatus of claim 8, wherein the fluid line is formed to connect separately to each microvalve by a branch from a main channel.

10. The multi-directional valve apparatus of claim 9, wherein the main channel is formed by a common membrane extending across all the microvalves, and which membrane seals over a groove in a common hard base to create the fluid line.

11. The multi-directional valve apparatus of claim 8, wherein the drive head has a forward surface with a groove, the groove moving from one ball bearing to another for selecting which valve to open, and the forward surface maintains one or more of the other valves closed.

12. The multi-directional valve apparatus of claim 11, wherein the groove is long or wide enough to open more than one of the microvalves.

13. The multi-directional valve apparatus of claim 8, wherein the drive head has more than one groove to allow more than one valve to be selectively opened.

14. The multi-directional valve apparatus of claim 8 having its multiple cups in a common hard base.

15. The multi-directional valve apparatus of claim 8, wherein the cups are all arranged in one or more rings.

16. The multi-directional valve apparatus of claim 15, wherein the rings are concentric.

17. The multi-directional valve apparatus of claim 15, wherein the or each ring is an open ring and thus generally C shaped rather than fully enclosed.

18. The multi-directional valve apparatus of claim 17, wherein an inflow to the valve apparatus is at or adjacent a gap of the at least one C ring.

19. The multi-directional valve apparatus of claim 8, wherein multiple outflow ports are provided, one from each cup.

20. The multi-directional valve apparatus of claim 8, wherein the drive head is maintained in its advance position by a spring located behind the drive head which applies a force to the ball bearings.

* * * * *